United States Patent
Ikeda et al.

(10) Patent No.: US 8,487,876 B2
(45) Date of Patent: Jul. 16, 2013

(54) ERGONOMIC HAND-HELD TEXT INPUT DEVICE

(75) Inventors: John Ikeda, Seattle, WA (US); Carl J. Ledbetter, Mercer Island, WA (US); Michael Baseflug, Duvall, WA (US); Eric Wahl, Kirkland, WA (US); Jared Randall, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 918 days.

(21) Appl. No.: 11/952,876

(22) Filed: Dec. 7, 2007

(65) Prior Publication Data

US 2009/0146958 A1 Jun. 11, 2009

(51) Int. Cl.
*G06F 3/02* (2006.01)
*G06F 3/033* (2006.01)
*G09G 5/00* (2006.01)
*A63F 9/24* (2006.01)
*A63F 13/02* (2006.01)

(52) U.S. Cl.
USPC ........... 345/169; 345/156; 345/168; 345/184; 463/37; 273/148 B

(58) Field of Classification Search
USPC ...... 345/156, 168–169, 172, 184; 463/37–38; 273/148 B
See application file for complete search history.

(56) References Cited

U.S. PATENT DOCUMENTS

| | | | |
|---|---|---|---|
| 5,207,426 A | 5/1993 | Inoue | |
| 6,031,518 A | 2/2000 | Adams | |
| 6,120,025 A | 9/2000 | Hughes, IV | |
| 6,132,118 A * | 10/2000 | Grezeszak | 400/489 |
| 6,288,709 B1 * | 9/2001 | Willner et al. | 345/169 |
| 6,429,852 B1 | 8/2002 | Adams et al. | |
| 6,614,420 B1 * | 9/2003 | Han et al. | 345/161 |
| 6,680,728 B1 | 1/2004 | Lilenfeld | |
| 6,724,366 B2 * | 4/2004 | Crawford | 345/157 |
| 6,743,100 B1 | 6/2004 | Neiser | |
| 7,088,339 B2 * | 8/2006 | Gresham | 345/168 |
| 7,116,311 B2 * | 10/2006 | Martinez et al. | 345/156 |
| 2004/0222970 A1 * | 11/2004 | Martinez et al. | 345/169 |
| 2005/0030288 A1 | 2/2005 | Johnson | |
| 2007/0060391 A1 * | 3/2007 | Ikeda et al. | 463/46 |

FOREIGN PATENT DOCUMENTS

EP 1475131 B1 5/2007

OTHER PUBLICATIONS

Block, G., "Xbox 360 Text-Input Device Preview", Apr. 9, 2007, http://uk.gear.ign.com, 2 pages.
Zaborowski, P.S., "ThumbTec: A New Handheld Input Device", Sound Processing and Control Laboratory, Faculty of Music—McGill Laboratory, http://delivery.acm.org, 4 pages.

* cited by examiner

*Primary Examiner* — Lun-Yi Lao
*Assistant Examiner* — Jarurat Suteerawongsa
(74) *Attorney, Agent, or Firm* — Woodcock Washburn, LLP

(57) ABSTRACT

A hand-held text input device includes a game controller and a keyboard. The device comfortably accommodates the hands of a user while the thumbs and fingers are associated with actuators of the game controller and keys of the keyboard. The overall configuration of the device and the arrangement of the actuators and keys permit the user to operate all of the functions provided by the device while the forearms are in a neutral posture zone between pronation and supination of the forearm, while the wrists are minimally extended, and while the fingers are comfortably flexed.

20 Claims, 6 Drawing Sheets

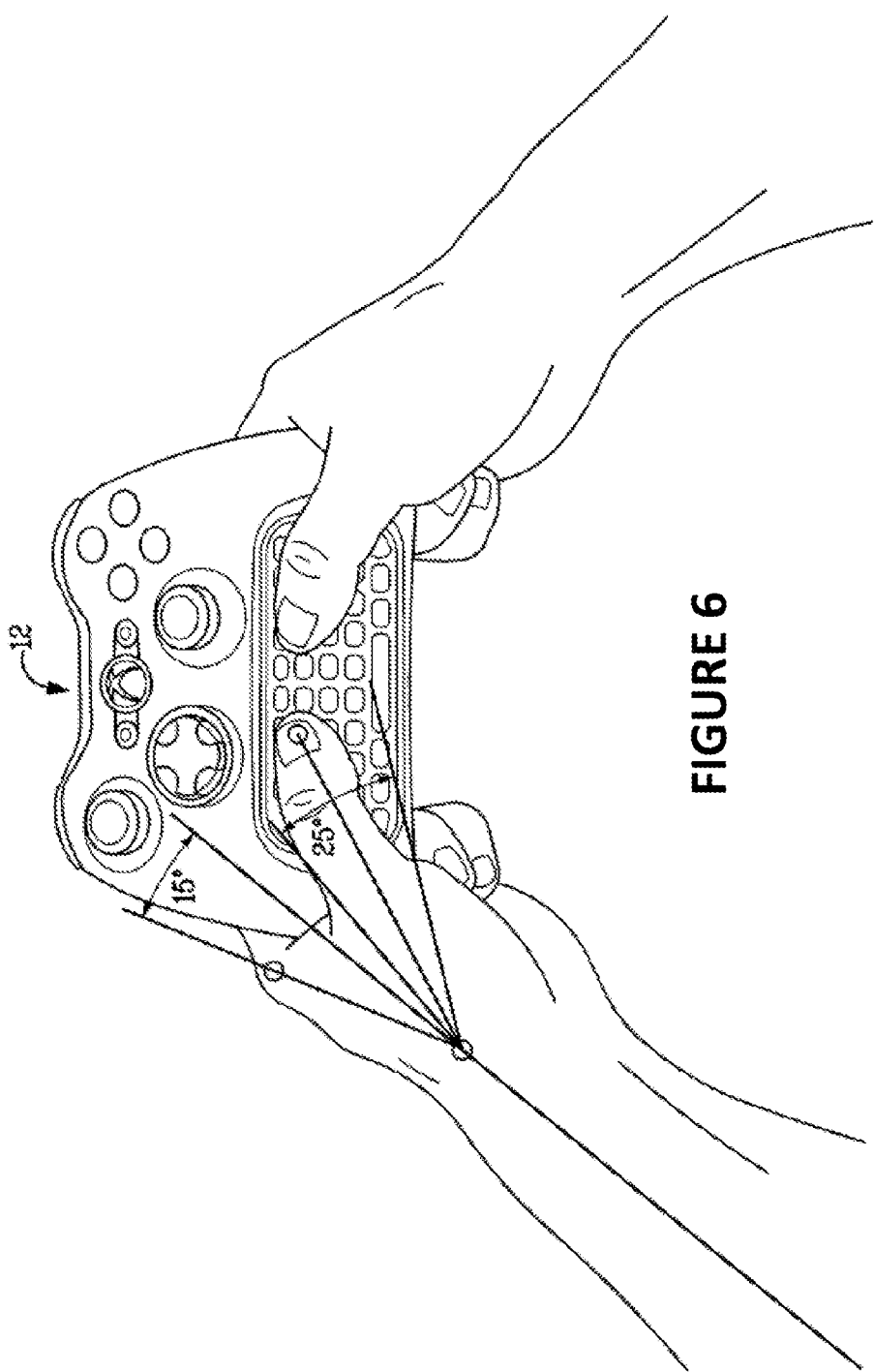

ERGONOMIC HAND-HELD TEXT INPUT DEVICE

TECHNICAL FIELD

The technical field relates generally to a hand held device for providing textual information, and more specifically relates to an ergonomically designed game controller and keyboard.

BACKGROUND

During online gaming, gamers typically communicate with each other. One mode of communication is via voice. Another mode of communication is via text that is entered via the display of the game console. Entering text via the display of the game console can be tedious, time consuming, and interfere with game play. Yet another mode of communicating text is via a keyboard connected to the game console. Entering text via a keyboard connected to the game console can be frustrating because it too interferes with game play because the user must take her hands off the game controller to enter text via the keyboard.

SUMMARY

This Summary is provided to introduce a selection of concepts in a simplified form that are further described below in the Detailed Description Of Illustrative Embodiments. This Summary is not intended to be used to limit the scope of the claimed subject matter.

In an example configuration, a hand-held text input device comprises a game controller and a keyboard. Game functionality is provided via actuators of the game controller and textual information is entered via the keys of the keyboard. The keyboard is attachable to the game controller. The hand-held text input device is ergonomically configured to allow use thereof when the hands and wrists of a user are in a natural and relaxed position. The hand-held text input device is configured to provide key button sizes and locations for comfortable thumb typing. When the keyboard is attached to the game controller, the bottom of the keyboard and the bottom of the game controller form a comfortable naturally extended grip surface. The overall configuration of the keyboard and actuators of the game controller permit a user to operate all functions provided by the actuators and to thumb-type on the keyboard while the user's wrists are in a neutral posture zone and the user's fingers and thumbs are comfortably flexed.

In an example configuration, all functionality of the keyboard and the game controller is available to the user while the user's hands and wrists are neutrally positioned within a range, from the user's $2^{nd}$ metacarpal, of a 15-degree angle abduction (in a direction away from the midline of the body) from the radius. Additionally thumb typing and access to all actuators is available while rotation of the user's $1^{st}$ metacarpal, $1^{st}$ phalange, and $1^{st}$ metacarpal are within a range of 25 degrees.

BRIEF DESCRIPTION OF THE DRAWINGS

The foregoing summary, as well as the following detailed description, is better understood when read in conjunction with the appended drawings. For the purpose of illustrating the hand-held text input device, there is shown in the drawings exemplary constructions thereof; however, the hand-held text input device is not limited to the specific methods and instrumentalities disclosed.

FIG. 6 is an illustration of a top view of a user's hands associated with the hand-held text input device.

DETAILED DESCRIPTION OF ILLUSTRATIVE EMBODIMENTS

A hand-held text input device comfortably accommodates the hands of a user while the thumb and fingers are associated with actuators and/or keys of the hand-held text input device. The overall configuration of the hand-held text input device and the arrangement of the actuators and keys permits the user to operate all of the functions provided by the hand-held text input device while the user's forearms are in a neutral posture zone between pronation and supination of the forearm, the user's wrists are minimally and comfortably extended, and the user's fingers comfortably flexed.

Figure 1:
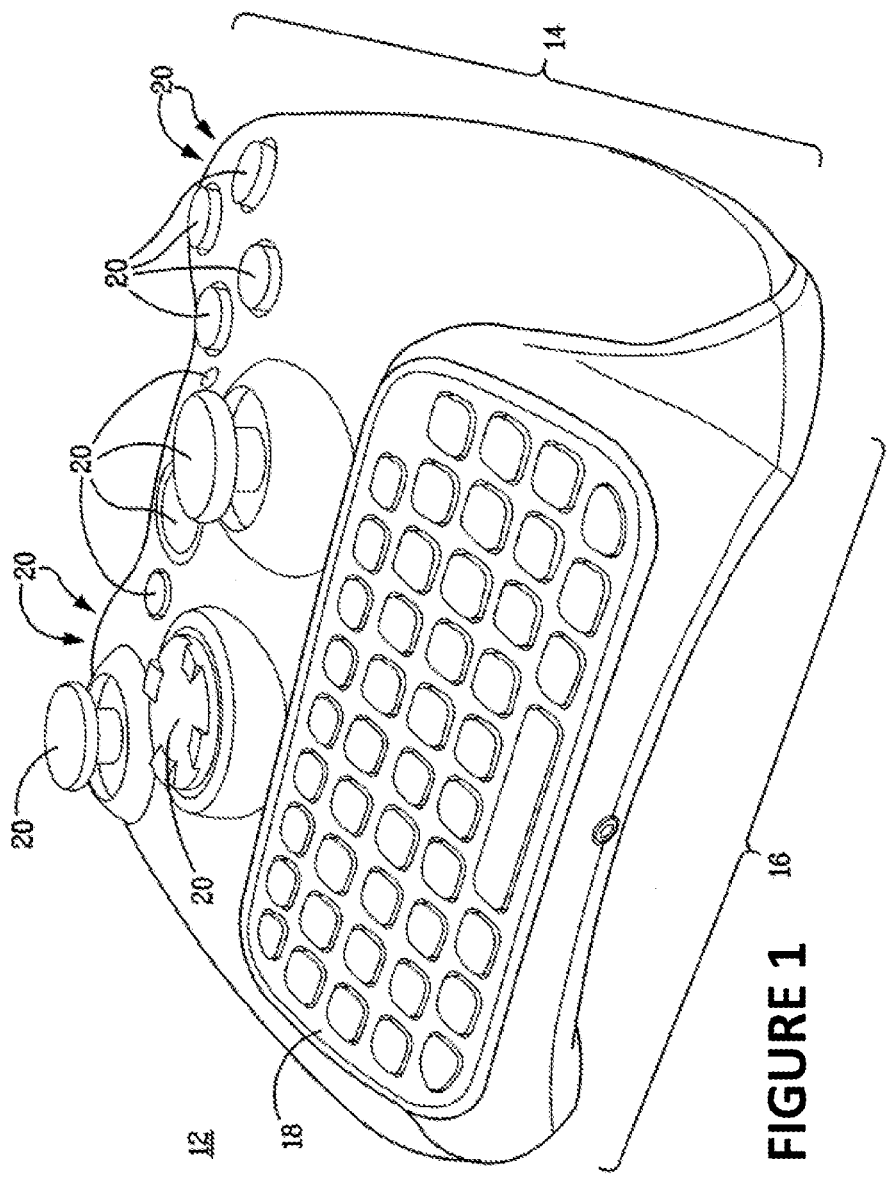
FIG. 1 is an illustration of an example hand-held text input device.

FIG. 1 is an illustration of an example hand-held text input device 12 comprising a first portion 14 and a second portion 16. In an example embodiment the first portion 14 comprises controller and the second portion 16 comprises a keyboard 18. The first portion can comprise any appropriate type of controller, such as a remote device controller, a game controller, or the like. In an example configuration, the game controller 14 comprises a Microsoft Corporation XBOX 360® game controller and the keyboard 18 comprises a QWERTY keyboard. In this embodiment, the first portion 14 is attachable to the second portion 16. When the second portion 16 is detached from the first portion 14, the portion 14 can operate in stand alone mode (i.e., the first portion 14 can operate on its own without being attached to the second portion 16) to provide control functions. The portions 14, 16 can be attached via any appropriate means, such as a pluggable connector for example. When the first portion 14 is connected to the second portion 16, the first portion 14 and the second portion 16 are in electrical communications therebetween. Actuators 20 allow a user to control game functionality. Various types of actuators capable of providing a multitude of game functionalities are labeled 20 for the sake of simplicity.

Figure 2:
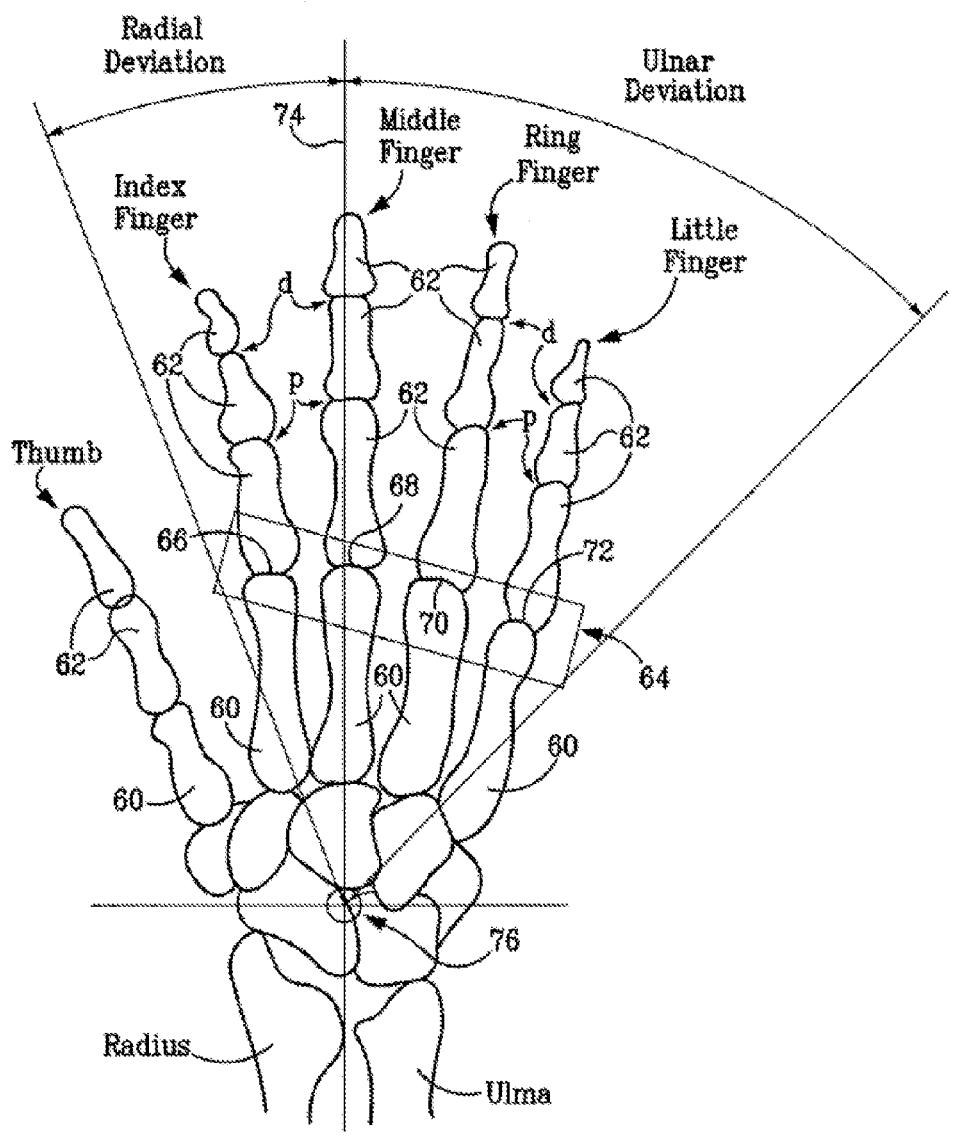
FIG. 2 is an illustration of a top view of a right-hand skeleton.

The hand-held text input device 12 is ergonomically designed to allow a user to manipulate the actuators 20 and conduct thumb typing while the hands, wrists, and forearms of the user are in a relaxed, comfortable, and neutral position. Anatomic terminology is utilized to describe the ergonomic features of the hand-held text input device 12. Some of the anatomic terminology is introduced with reference to FIG. 2, which is a top view of a right-hand skeleton. As shown in FIG. 2, there are five major hand bones radiating from the wrist area, which are known as the metacarpals 60. There are fourteen finger bones in each hand and are designated as phalanges 62. Particular fingers have conventional designations; namely, from right to left in FIG. 2, the thumb (first finger), index finger (second finger), middle finger (third finger), ring finger (fourth finger), and little finger (fifth finger). It is to be understood that although a right-hand skeleton is depicted in FIG. 2, a mirror image left-hand skeleton can be described using the same anatomic terminology.

Where each finger meets the palm or, more precisely, where the metacarpal bones 60 and phalangeal bones 62 of the fingers join, there are defined metacarpal-phalangeal joints 66, 68, 70, 72. The joints between the phalangeal bones 62 are referred to as interphalangeal joints. For digits 2 through 5 (index finger, middle finger, ring finger, and little finger, respectively), the interphalangeal joints closest to the finger tip are referred to as distal interphalangeal joints, and are labeled with the letter "d" in FIG. 2. For digits 2 through 5, the interphalangeal joints closest to the metacarpals 60 are referred to as proximal interphalangeal joints, and are labeled with the letter "p" in FIG. 2. A metacarpal-phalangeal ridge 64 is defined by the portion of the hand in the vicinity of these four joints. Thus, the metacarpal-phalangeal ridge 64 includes the second (finger) metacarpal-phalangeal joint 66, the third metacarpal-phalangeal joint 68, the fourth metacarpal-phalangeal joint 70, and the fifth metacarpal-phalangeal joint 72. The hand-held text input device 12 is configured to accommodate the metacarpal-phalangeal joint ridge 64 such that a user's hands and arms remain comfortable, the user's index and middle fingers can comfortably manipulate associate actuators, and the user's thumbs can comfortably manipulate associate actuators and enter keystrokes via the keyboard 18. As illustrated in FIG. 2, with a hand on a flat surface, radial deviation is rotation of the wrist toward the thumb and ulnar deviation is rotation of the wrist toward the little finger. Both radial deviation and ulnar deviation are measured relative to the axis 74 passing through the center of the wrist joint 76.

Figure 3:
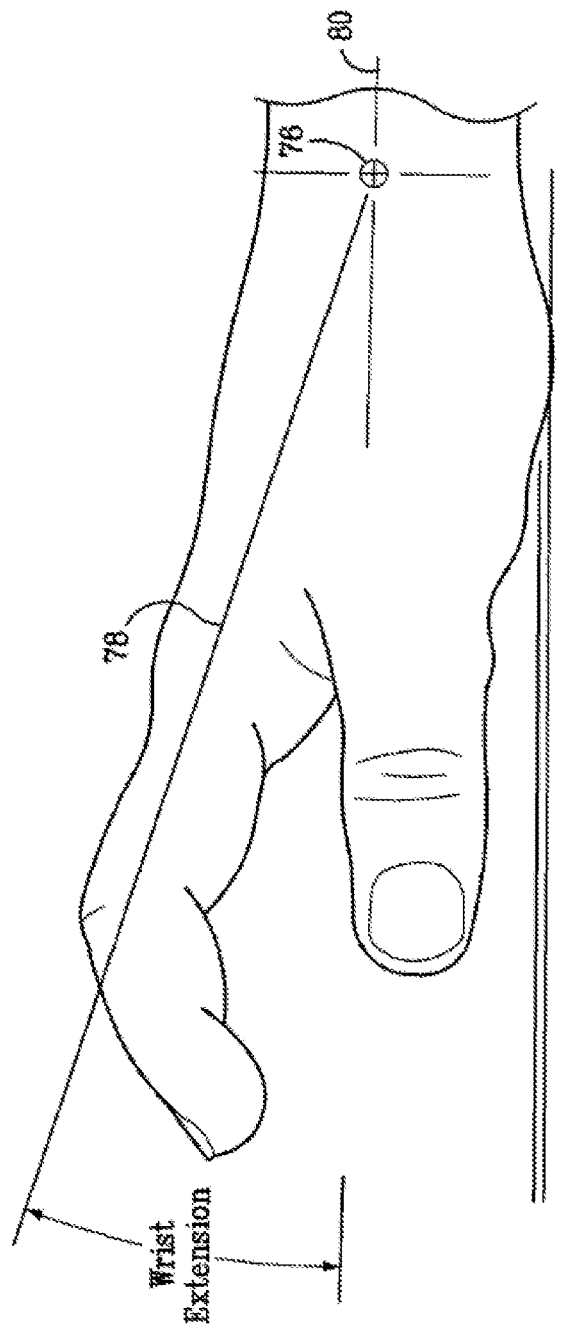
FIG. 3 is an illustration of a side view of a right hand and wrist depicting wrist extension.
Figure 4:
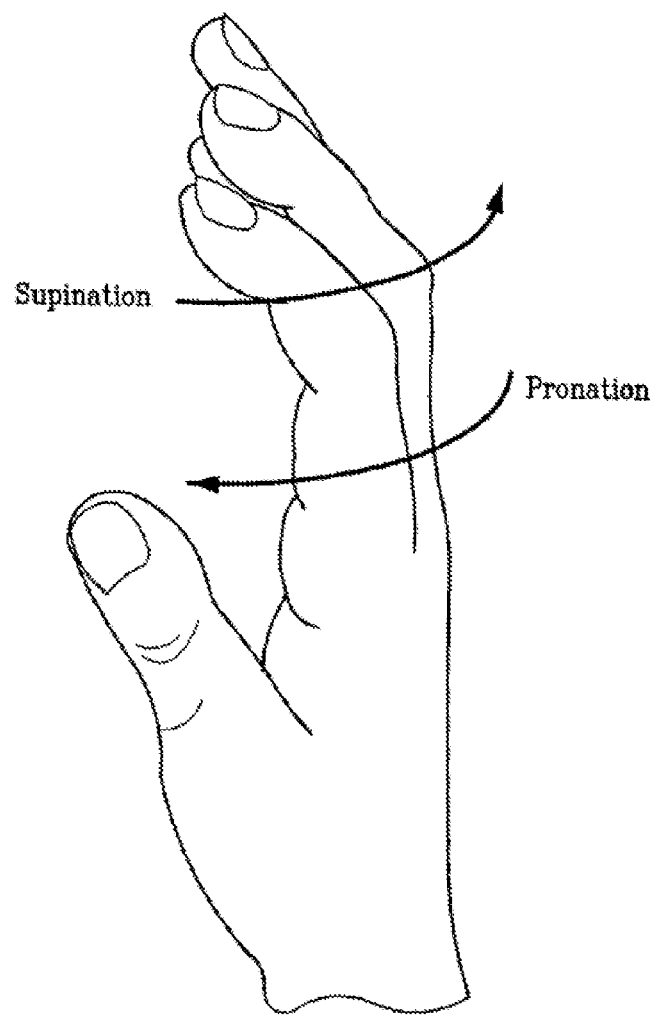
FIG. 4 is an illustration of a side view of a right hand and wrist depicting rotation.

FIG. 3 is a side view of a right hand and wrist illustrating wrist extension. Wrist extension is measured as an angle created by an inclination of the hand plane 78 relative to a horizontal axis 80 passing through the center of the wrist joint 76. The hand plane 78 is defined as that plane within which reside the second through fifth metacarpal bones. FIG. 4 is a side view of a right hand and wrist illustrating rotation. As shown in FIG. 4, supination refers to rotation of the forearm and wrist such that the palm tends to face forward or upward and the radius tends to lie parallel to the ulna. Pronation refers to rotation of the forearm and wrist such that the palm tends to face backward or downward.

Figure 5:
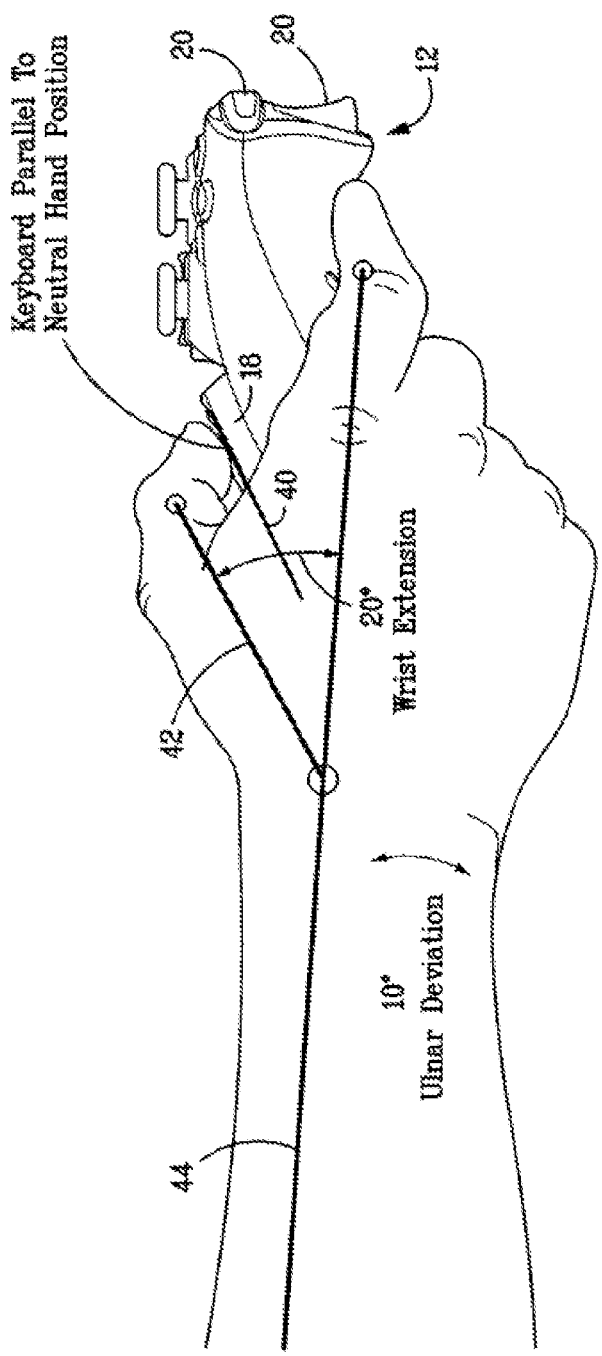
FIG. 5 is an illustration of a side view of a user's hands associated with the hand-held text input device.

FIG. 5 is a side view of a user's hands associated with the hand-held text input device 12. Ergonomic criteria for each point of contact between the user and the hand-held text input device is quantified and incorporated such that the user can grasp and use the hand-held text input device in a biomechanical neutral position. Such a neutral position is achieved when the flexors and extensors of the user's hands and wrists are in equilibrium, where intracarpal pressure is minimized and flexors and extensor muscles are positioned for optimal application of strength. As illustrated in FIG. 5, a biomechanically neutral zone is achieved when the user can control the hand-held text input device with the wrists extended about 20 degrees, the hands having an ulnar deviation of about 10 degrees, the metacarpal-phalangeal joints of digits 2 through 5 (i.e., the index finger, the middle finger, the ring finger, and the little finger, respectively) are flexed about 45 degrees, the proximal interphalangeal joints are flexed in a range about 30 degrees to 45 degrees, the distal interphalangeal joints are flexed in a range about 10 degrees to 20 degrees, the first metacarpals (metacarpal of the thumb) are partially abducted (tending toward pronation), the first metacarpals are opposed metacarpals of digits 2 through 5, the metacarpal-phalangeal joints of the thumbs are flexed about 10 degrees, the interphalangeal joints of the thumbs are flexed about 5 degrees, and the angle of the second metacarpals are about 15 degrees abduction from each respective radius. In the biomechanical neutral position, approximately zero degree alignment is achieved from the radius to the $2^{nd}$ proximal interphalangeal joint (proximal interphalangeal joint of the index finger of each hand) as illustrated by line 44 in FIG. 5.

Additionally, in the biomechanical neutral position, the keyboard 18 is essentially parallel to the neutral hand position. This is shown in FIG. 5, wherein the plane 40 of the surface of the keyboard 18 is parallel to line 42 through the $1^{st}$ metacarpal (metacarpal of the thumb). When the first portion 14 is attached to the second portion 16, the bottom of the first portion 14 and the bottom of the second portion 16 form a comfortable naturally extended grip surface.

FIG. 6 is a top view of a user's hands associated with the hand-held text input device 12. As illustrated in FIG. 6, in the biomechanical neutral position, all functionality of the keyboard and the game controller is available to the user. The user can enter text by typing with the user's thumbs (thumb-typing). Actuators can be accessed via any of the user's fingers (including the thumbs). When using the hand-held text input device, the user's hands and wrists are neutrally positioned within a range, from the user's $2^{nd}$ metacarpals (metacarpal of the index fingers), within a 15-degree angle abduction from the radius. Additionally thumb typing and access to all actuators is available while rotation of the user's $1^{st}$ metacarpals and $1^{st}$ phalanges (metacarpal and phalange of the thumbs) are within a range of 25 degrees. Angles for the only the left hand are depicted in FIG. 6 for the sake of simplicity.

The sizes and locations of the keys on the keyboard 18 provide comfortable typing while hands are in the biomechanical neutral position. The surface of each key is rounded and extended slightly from the surface of the keyboard. The keys provide tactile feedback allowing the user select desired keys.

The ranges and specific dimensions for the example embodiments of the hand-held text input device described herein were determined via the use of anthropometric data, biomechanics, and observation-based methodologies. It is to be understood however, that the ranges and/or dimensions provided herein are accurate within a range of about 1 millimeter, and minor deviations from the stated ranges and/or dimensions do not adversely affect the ergonomic advantages provided by the hand-held text input device.

The hand-held text input device provides an ergonomic text input device that will accommodate hands sized within a range of a fifth percentile female to a ninety-fifth percentile male, considering North American adults. Alternatively, users having hands falling outside of this design range may still enjoy the advantages of the hand-held text input device, by appropriately scaling up or down the configuration of the hand-held text input device. Additionally, users having hands falling outside of this design range may still enjoy the advantages of the hand-held text input device, by hand maneuvering outside of the above described ranges.

While a hand-held text input device has been described above using exemplary embodiments and figures, it is to be understood that other similar embodiments can be used or modifications and additions can be made to the described embodiments for performing the same functions without deviating therefrom. Therefore, a hand-held text input device as described herein should not be limited to any single embodiment, but rather should be construed in breadth and scope in accordance with the appended claims.

What is claimed:
1. A hand-held device comprising:
   a first portion comprising a controller comprising a plurality of actuators and two gripping portions that are immovable relative to one another; and a second portion comprising a keyboard that is mounted in between the two gripping portions, the first portion and the second portion being detachable, when the first portion is detached from the second portion, the first portion is configured to operate in stand alone mode, the keyboard configured for entering text via thumb-typing, the hand-held device having an ergonomic shape that is quantified, at least in part, on the basis of a biomechanical neutral position, the biomechanical neutral position defined, at least in part, by:

an approximately zero degree alignment between a radius bone and a proximal interphalangeal joint of an index finger of a user when the user is thumb-typing upon the keyboard of the device and further defined by maintaining the approximately zero degree alignment when the user is operating the plurality of actuators of the controller;

metacarpal-phalangeal joints of digits 2 through 5 of the user flexed about 45 degrees; and metacarpal-phalangeal joints of the thumbs of the user flexed about 10 degrees.

2. The device in accordance with claim 1, wherein a bottom of the first portion and a bottom of the second portion form a comfortable naturally extended grip surface.

3. The device in accordance with claim 1, the device configured to permit the user to selectively attach the second portion to the first portion, and wherein the biomechanical neutral position allows the user to operate the actuators and to thumb-type on the keyboard without changing a grasp upon the device.

4. The device in accordance with claim 1, the biomechanical neutral position further defined by a wrist extension of about 20 degrees.

5. The device in accordance with claim 1, the biomechanical neutral position further defined by an ulnar deviation of about 10 degrees.

6. The device in accordance with claim 1, the biomechanical neutral position further defined by proximal interphalangeal joints of the user flexed in a range about 30 degrees to 45 degrees.

7. The device in accordance with claim 1, the biomechanical neutral position further defined by distal interphalangeal joints of the user flexed in a range about 10 degrees to 20 degrees.

8. The device in accordance with claim 1, the device configured to permit the user to thumb-type on the keyboard while first metacarpals of the user are partially abducted.

9. The device in accordance with claim 1, the device configured to permit the user to thumb-type on the keyboard while first metacarpals of the user are opposed to metacarpals of digits 2 through 5 of the user.

10. The device in accordance with claim 1, the biomechanical neutral position further defined by interphalangeal joints of the thumbs of the user flexed about 5 degrees.

11. The device in accordance with claim 1, the biomechanical neutral position further defined by an angle of second metacarpals of the user abducted about 15 degrees from a radius of the user.

12. The device in accordance with claim 1, the biomechanical neutral position further defined by a surface of the keyboard being substantially parallel to a metacarpal of the thumb of the user.

13. The device in accordance with claim 1, the biomechanical neutral position further defined by rotation of first metacarpals of the user and first phalanges of the user within a range of 25 degrees.

14. The device in accordance with claim 1, wherein the keyboard is a QWERTY keyboard.

15. A hand-held device comprising:

a first portion comprising a controller comprising a plurality of actuators and two gripping portions that are immovable relative to one another; and a second portion comprising a keyboard that is mounted in between the two gripping portions, the first portion and the second portion being detachable, when the first portion is detached from the second portion, the first portion is configured to operate in stand alone mode, the keyboard configured for entering text via thumb-typing, the hand-held device having an ergonomic shape that is quantified, at least in part, on the basis of a biomechanical neutral position, the biomechanical neutral position defined, at least in part, by:

an approximately zero degree alignment between a radius bone and a proximal interphalangeal joint of an index finger of a user when the user is thumb-typing upon the keyboard of the device and further defined by maintaining the approximately zero degree alignment when the user is operating the plurality of actuators of the controller;

metacarpal-phalangeal joints of digits 2 through 5 of the user flexed about 45 degrees; and interphalangeal joints of the thumbs of the user flexed about 5 degrees.

16. The device in accordance with claim 15, wherein a bottom of the first portion and a bottom of the second portion form a comfortable naturally extended grip surface.

17. The device in accordance with claim 15, the device configured to permit the user to selectively attach the second portion to the first portion, and wherein the biomechanical neutral position allows the user to operate the actuators and to thumb-type on the keyboard without changing a grasp upon the device.

18. The device in accordance with claim 15, the biomechanical neutral position further defined by a wrist extension of about 20 degrees.

19. The device in accordance with claim 15, the biomechanical neutral position further defined by an ulnar deviation of about 10 degrees.

20. The device in accordance with claim 15, the biomechanical neutral position further defined by proximal interphalangeal joints of the user flexed in a range about 30 degrees to 45 degrees.

* * * * *